(12) United States Patent
Eckhardt et al.

(10) Patent No.: US 11,609,171 B2
(45) Date of Patent: Mar. 21, 2023

(54) QUALIFICATION PROCESS FOR CRYO-ELECTRON MICROSCOPY SAMPLES AS WELL AS RELATED SAMPLE HOLDER

(71) Applicant: Xtal Concepts GmbH, Hamburg (DE)

(72) Inventors: Annette Eckhardt, Hamburg (DE); Arne Meyer, Hamburg (DE); Karsten Dierks, Hamburg (DE)

(73) Assignee: Xtal Concepts GmbH, Hamburg (DE)

( * ) Notice: Subject to any disclaimer, the term of this patent is extended or adjusted under 35 U.S.C. 154(b) by 342 days.

(21) Appl. No.: 15/931,776

(22) Filed: May 14, 2020

(65) Prior Publication Data

US 2020/0363345 A1    Nov. 19, 2020

(30) Foreign Application Priority Data

May 17, 2019    (EP) .................................... 19175196

(51) Int. Cl.
*G01N 15/02* (2006.01)
*G01N 23/06* (2018.01)
*G01N 1/42* (2006.01)

(52) U.S. Cl.
CPC ......... *G01N 15/0211* (2013.01); *G01N 15/02* (2013.01); *G01N 15/0205* (2013.01); *G01N 23/06* (2013.01); *G01N 1/42* (2013.01); *G01N 2015/0222* (2013.01); *G01N 2223/04* (2013.01); *G01N 2223/3103* (2013.01)

(58) Field of Classification Search
CPC ............... G01N 15/02; G01N 15/0205; G01N 15/0211; G01N 2015/0222
USPC .................................................. 356/335, 336
See application file for complete search history.

(56) References Cited

U.S. PATENT DOCUMENTS

| | | | | |
|---|---|---|---|---|
| 7,471,393 B2* | 12/2008 | Trainer | .............. | G01N 15/0205 |
| | | | | 356/336 |
| 7,491,409 B1* | 2/2009 | Meers | ..................... | A61P 35/00 |
| | | | | 264/4.1 |
| 9,644,038 B2* | 5/2017 | Luo | ....................... | C07K 14/775 |
| 9,664,608 B2* | 5/2017 | Reed | .................. | G01N 15/0211 |
| 9,732,337 B2* | 8/2017 | Shapiro | ................... | A61P 31/12 |
| 9,884,893 B2* | 2/2018 | Glanville | ............... | G16B 20/30 |
| 9,939,363 B2* | 4/2018 | Wachemig | ......... | G01N 15/1463 |
| 10,172,795 B2* | 1/2019 | Gao | ..................... | A61K 9/1271 |

(Continued)

OTHER PUBLICATIONS

Meyer, A., et al.: "A time-efficient identification of the best conditions for cryo-EM, NMR, SAXS and crystallization applying in situ DLS", iNEXT meets Industry, Mar. 5, 2018 (Mar. 5, 2018), XP055633814, Grenoble-France, found in internet: URL:http://www.esrf.eu/files/live/sites/www/files/events/conferences/2018/iNEXT%20meets%20industry/abstractsforposters/Meyer.pdf (found on Oct. 18, 2019), lines 7-9, lines 11-12, lines 18-19.

(Continued)

*Primary Examiner* — Allen C. Ho
(74) *Attorney, Agent, or Firm* — Patent Central LLC; Stephan A. Pendorf (57) ABSTRACT

A qualification process for a sample to be examined by means of cryo-electron microscopy. The, sample (12) is applied to a sample carrier (10) provided for cryo-electron microscopy and subsequently the sample (12) arranged on the sample carrier is examined by means of dynamic light scattering. The particle size distribution within the sample (12) is determined by means of the dynamic light scattering. Further, a sample holder designed to carry out the qualification process.

5 Claims, 5 Drawing Sheets (56) References Cited

U.S. PATENT DOCUMENTS

| | | | |
|---|---|---|---|
| 10,301,621 B2* | 5/2019 | Shapiro | C12N 15/87 |
| 10,427,163 B2* | 10/2019 | Corbett | B01L 9/06 |
| 10,456,452 B2* | 10/2019 | Ghoroghchian | A61K 9/10 |
| 10,835,493 B2* | 11/2020 | Hsieh | A61K 9/1271 |
| 10,928,290 B2* | 2/2021 | Wachernig | G01N 15/0211 |
| 10,942,107 B2* | 3/2021 | Wei | A61K 8/342 |
| 11,002,655 B2* | 5/2021 | Corbett | G01N 15/0211 |
| 11,033,520 B2* | 6/2021 | Nikoulin | A61K 9/19 |
| 11,047,786 B2* | 6/2021 | Yamaguchi | G01N 15/042 |
| 11,112,342 B2* | 9/2021 | Corbett | G01N 15/1434 |
| 11,112,344 B2* | 9/2021 | Tomita | G01N 15/0266 |
| 11,187,638 B2* | 11/2021 | Corbett | G01N 15/0211 |
| 11,193,877 B2* | 12/2021 | Potenza | G01N 15/0211 |
| 11,199,486 B2* | 12/2021 | Corbett | G01N 15/0211 |
| 11,207,422 B2* | 12/2021 | Coleman | A61K 47/6915 |
| 11,237,094 B2* | 2/2022 | Corbett | G01N 15/1434 |
| 11,415,499 B2* | 8/2022 | Mori | G01N 15/10 |
| 11,441,991 B2* | 9/2022 | Hamilton | G01N 15/0211 |
| 11,448,579 B2* | 9/2022 | Mori | G01N 21/4788 |
| 11,493,422 B2* | 11/2022 | Hill | G01N 21/03 |

OTHER PUBLICATIONS

European Search Report dated Oct. 30, 2019, in European Application No. EP 19175196.5.

* cited by examiner

QUALIFICATION PROCESS FOR CRYO-ELECTRON MICROSCOPY SAMPLES AS WELL AS RELATED SAMPLE HOLDER

BACKGROUND OF THE INVENTION

Field of the Invention

The invention relates to the field of dynamic light scattering, DLS for short, and the field of cryo-electron microscopy, cryo-EM for short, in particular the qualification of a sample prepared for cryo-electron microscopy arranged on a cryo-electron microscopy sample carrier, in short, a sample on a cryo-EM grid.

Description of the Related Art

DLS is an analysis method that is carried out on dissolved or suspended samples, usually proteins, by means of scattered light from a laser. DLS is a non-invasive method that can measure both absolute particle sizes and the distribution of sizes in a mixture of different particles. In contrast to transmission electron microscopy, or TEM for short, the process of dynamic light scattering for determining the aggregation behavior in a sample is not an imaging process. The so-called in situ DLS technique is known as the state of the art with regard to dynamic light scattering, in which a focused laser beam is directed directly in a sample, which is in a transparent container, and the fluctuations of the scattered light are quantitatively evaluated, wherein the particle size and its distribution are calculated by mathematical methods from these interference phenomena.

Further in the prior art cryo-electron microscopy it is known, wherein said cryo-EM is a form of transmission electron microscopy, wherein biological samples are examined at cryogenic temperatures or about, or less than, −150° C., in particular, wherein a study close to the native state of the sample can be done, in particular a three-dimensional structure determination of macromolecules can be done by single particle electron microscopy.

Before the actual analysis of a sample by means of cryo-electron microscopy, this is usually initially examined (qualified) with regard to their suitability, with the aim of increasing the probability that the sample or type of particle to be examined by means of cryo-electron microscopy does not exist as a clump.

For years, this qualification is mainly solved through a preliminary investigation with a more economically favorable method compared to the freeze—or cryo electron microscopy, namely transmission electron microscopy, in short TEM, by an image of the sample recorded with lower magnification and here the size distribution is judged on the basis of appearance of the particles in the image.

This approach, however, has some disadvantages in that the validity of this preliminary investigation method affects the quality of a sample. It is disadvantageous, for example, that the sample must be completely dried out for these qualification processes by means of TEM, since water would impair the vacuum required for imaging in the microscope. However, since water is often the main component of the buffer solution of the biological macromolecules, drying often leads to oversaturation and thus aggregation of the sample. In this case of the TEM preliminary investigation would result in a false negative qualification, that is, identify the sample as not suitable for the cryo-electron microscopy. Since heavy metal salts such as uranyl acetate are also used as contrast agents in the TEM examination and these can be bound to the surface of, for example, biological macromolecules, for example proteins, the similar charge can lead to rejection effects. It cannot therefore be ruled out that the protein will de-aggregate so that a false positive qualification result is given after the preliminary TEM examination. TEM is therefore not a reliable preliminary examination method or qualification process, since the sample has to be changed considerably for this examination. It is thus an invasive procedure, wherein the specimen-evaluating does not occur under the same conditions as the subsequent cryo-EM-recording. The qualification by transmission electron microscopy are therefore only evidence that the sample could be intact if complexes do not dissociate and macromolecules not aggregated.

Other disadvantages of transmission electron microscopy are, of course, the considerable technical effort that imaging by means of TEM represents. Not only the cost of ownership and operation of TEM are considered, but also the user's high skill level, as well as the design-related comparatively low sample throughput.

Overall, there is therefore the technical problem of finding an alternative method to transmission electron microscopy for the qualification of samples intended for cryo-electron microscopy, which firstly overcomes the disadvantages of TEM and in addition also solves additional problems or can exclude them from the outset, wherein it was recognized in particular on the part of the inventor that the sample carrier for a sample is a possible source of the problem or error for cryo-electron microscopy. It must be ensured that in single-particle electron microscopy particle type or molecular complexes under investigation do not form clumps and do not dissociate, which in practice often present a problem.

BRIEF SUMMARY OF THE INVENTION

This objective is solved by a qualification process according to the main claim as well as a dynamic light scattering arrangement and appropriately associated sample holder according to the ancillary claims. Further advantageous embodiments can be found in the subclaims.

The process of qualification of a sample to be examined by means of cryo-electron microscopy is characterized by applying the sample to a sample holder intended for cryo-electron microscopy (cryo-electron microscopy-sample carriers, also referred to as cryo-EM Grid) and then examining the sample arranged on the sample holder by means of dynamic light scattering (DLS), whereby the particle size distribution within the sample is determined by means of dynamic light scattering.

New to the invention is in particular that the dynamic light scattering DLS can be measured for the first time on samples located directly on the provided sample support for cryo-electron microscopy (cryo-electron microscopy-sample carrier, also referred to as cryo-EM Grid).

In the context of this invention, the inventors recognized that even the actual cryo-electron microscopy-sample carrier (cryo-EM grid) can exert a clumping effect on the sample. Ideally, the grid material itself has no influence on the sample. However, the previous investigations have shown an influence of the grid material on the sample, which the inventors worked out during investigations (see FIG. 5a, 5b). Therefore, an examination of the sample on the cryo-microscopy-sample carrier (cryo-EM Grid) is essential for a reliable assessment of sample quality. This means that all internal and external influences that affect the aggregation behavior and thus the sample quality are taken into account in one process. Changes in the sample due to interactions with the grid material often result in a change in the particle size distribution, which can then be determined using DLS. Starting with a uniform particle size, both a reduction and an enlargement of the particles, as a result of contact with the grid surface, can occur as an undesirable interaction.

Instead of an image of the particles, a size/frequency diagram is obtained. Since for microscopic applications in the field of macromolecular structure elucidation, discrete particle sizes, as well as uniform samples, have to be used, DLS represents a suitable method of detection. This has already been shown in samples that were examined with a conventional DLS system.

As a suggestion for implementation it should be noted that the applied sample volume of less than one to a few microliters, as well as the about 7 square millimeter area to be covered, results in a low layer thickness of the sample, this presenting an enormous challenge for measurements by dynamic light scattering. In addition the sample must be protected from evaporation during the measurement period because otherwise the sample composition varies, that is, the sample dries out, which in turn could lead to the same negative effects as the cause drying of the TEM sample. A suitable design can be achieved by various methods, namely, for example, by conditioning of the air in the measuring chamber or by sealing.

Decisive advantages over the preliminary examination using TEM are in particular:
  no change in the sample, since a non-invasive in-situ procedure is used to qualify the sample—no influence of the measurement on the sample such as heating, inelastic scattering, chemical change;
  significantly less technical effort for DLS compared to TEM and therewith time and cost savings;
  significantly higher sample throughput and the associated possibility to test several parameters in combinations;
  furthermore, a sample treatment analogous to the shock freezing process can be used; as well as
  lower necessary qualifications of the user.

There are technical and economic advantages to the invention since an economical process can be used, and for the first time actually a highly reliable qualification of samples can be done for cryo-electron microscopy.

The invention allows both a qualitative size determination of particles on the sample carrier for cryo-electron microscopy and a quantitative evaluation of the size distributions. Both properties can be used for sample evaluation. The quantitative size measurement is used here to judge whether, for example, a macromolecular complex is present intact or if it has disintegrated into subcomponents.

Through DLS two aspects of quality are available, one being homogeneity of the sample (generally necessary for the cryo-EM evaluation because it is an averaging method), and secondly the absolute size, ensuring the correct size of the desired macromolecule (e.g. disintegration of complexes in homogeneous form).

By means of the determination of the particle size distribution a study of the sample for clumping can in particular be carried out.

Further, the sample studied for qualification on the sample carrier can then be examined with the sample carrier by means of cryo-electron microscopy.

In particular, the laser beam path can be directed through the sample without impinging on the sample carrier provided for the cryo-electron microscopy.

In a further embodiment, the cryo-electron sample carrier parameters can be adapted as part of the sample preparation for cryo-electron microscopy by matching the cryo-electron sample carrier material and/or other properties of the cryo-electron sample carrier. To prevent aggregation or clumping on the cryo-electron microscopy sample carrier (cryo-EM-Grid) several parameters can be varied, including, for example, the grid material (copper, gold, silicon, platinum), the surface coating of the grid, static charge, or the so-called buffer substance in which the sample is located.

However, in order to be able to adapt these parameters specifically to a sample, it is necessary to determine what effect the variations of the parameters have on the sample. Until now, this was done by electron microscopy itself, but this is a time-consuming and expensive process for determining the sample quality. The measurement using DLS directly on the grids offers decisive advantages here, namely the time and equipment cost savings, the high reliability of the information and the simple implementation.

As already described, the qualitative size distribution determination can be used to identify the clumping effect of the grid surface and by systematically varying the grid parameters to exclude it as far as possible. This would allow for the first time a standardizing of the adaptation of the grid parameters as part of sample preparation for cryo-electron microscopy.

The dynamic light scattering arrangement (DLS arrangement) is discussed in the following by way of example but not necessarily in a restrictive manner:

A laser and detector optics are arranged in an optical head, wherein the scattered light of the laser, caused by the scattering effect of particles, is bundled on an optical fiber. The fiber directs the scattered light to an amplifier, in the specific case implemented by a photomultiplier. This converts the incoming photons into electrical signals, which are evaluated by an autocorrelator using mathematical algorithms. The result is a particle size distribution that can be represented in the form of diagrams, see FIG. 1.

According to the invention, the sample volume penetrated by the laser is located directly on the surface of a sample holder designed for cryo-electron microscopy, in short cryo-EM-Grid or just a grid.

The sample is protected from drying out by a layer of paraffin oil. The cryo-EM grid is arranged vertically in this case, the present invention sample carrier having been developed to allow an easy handling of the grid, see FIGS. 2a, 2b and 3a, 3b.

The dynamic light scattering arrangement is designed in such a manner for the execution of the qualification process according to the inventive method, that the laser-beam path is passed through the sample without encountering the sample carrier provided for the cryo-electron microscopy.

The laser should be positioned so that the beam path passes through the sample volume without striking the grid surface, since this could result in, on the one hand, undesired scattered light off the grid and, on the other hand, a heating of the grid and thus the sample. In addition, care must be taken that the fluctuating scattered light interference pattern, caused by the particle movement, can be recorded by the detector.

The inventive sample holder related to the dynamic light scattering array is designed for the implementation of the inventive qualification procedure and with use of dynamic light scattering arrangement in such a manner, that the sample holder has a receiving means for the sample carrier provided for the cryo-electron microscopy, wherein according to the invention the sample is applied during the implementation of the qualification process on the sample holder provided for the cryo-electron microscopy.

BRIEF DESCRIPTION OF THE SEVERAL VIEWS OF THE DRAWINGS

Embodiments of the invention will be described in detail qirg reference to the accompanying illustrations, which are intended to illustrate the invention and are not to be regarded as limiting.

There is shown in.

DETAILED DESCRIPTION OF THE INVENTION

At this point, it should be pointed out that the exemplary embodiment or the embodiments serve for the explanation and are not necessarily to be considered as restrictive.

Figure 1:
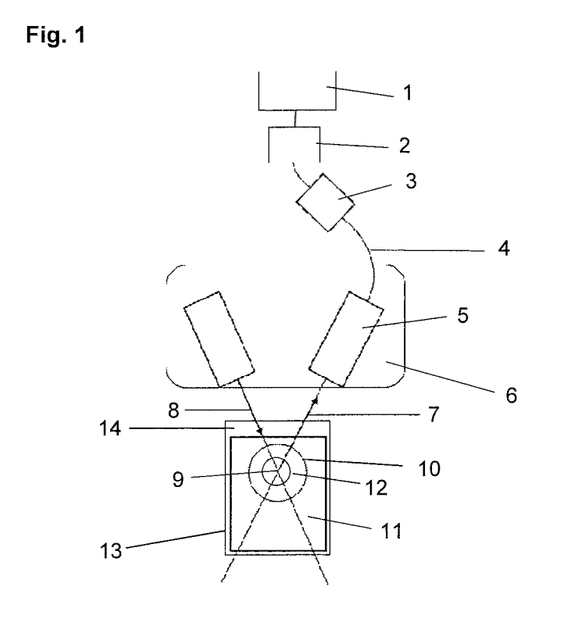
FIG. 1 a schematic illustration of an exemplary embodiment of the DLS measuring apparatus.

In FIG. 1 a schematic representation of an embodiment of the DLS measurement apparatus is shown.

FIG. 1 shows the basic DLS measurement setup consisting of the most important optics and electronics components. The confocal adjustment of laser beam 8 and detector 5, which must be ensured for the measuring principle, is implemented in the optical head 6. This measurement volume 9 is positioned within the drop that adheres to the grid.

Figure 2A:
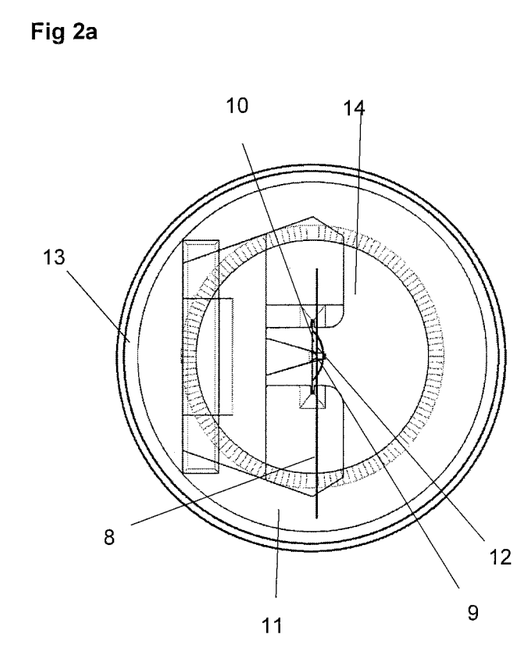
FIG. 2a, b a schematic representation of an exemplary embodiment of the grid holder 11 with the sample 12 which in turn is located on the grid.
Figure 2B:
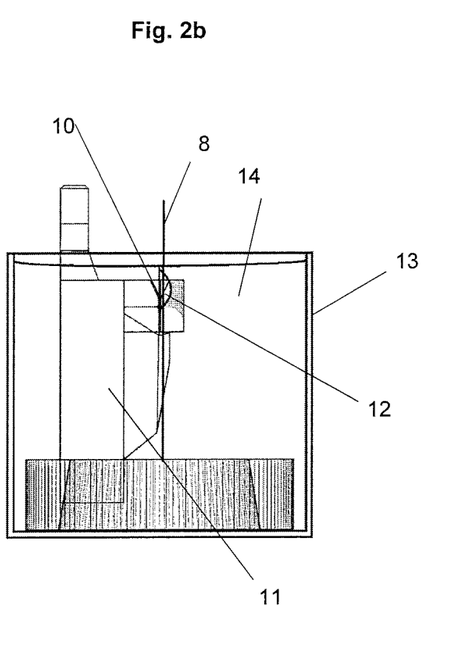

FIGS. 2a and 2b show a schematic illustration of an exemplary embodiment of the grid holder 11 with the sample 12 which adheres to the grid surface.

Figure 3A:
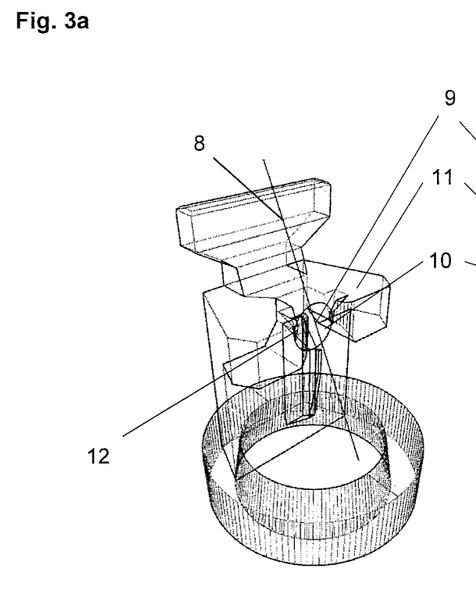
FIG. 3a, b a schematic representation of an embodiment of the grid holder 11 with inserted grid.
Figure 3B:
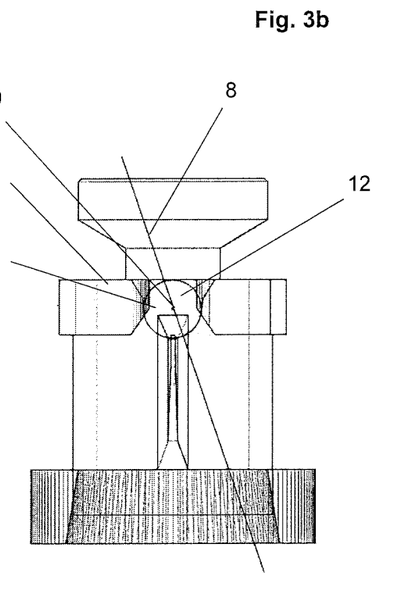

FIGS. 3a and 3b are schematic diagrams in which an embodiment of the grid holder 11 with the inserted grid is shown.

In the embodiment presented above (FIGS. 2a, 2b and 3a, 3b), a holder is inserted into a multiwell plate, which holder can accommodate a grid so that the laser beam 8 bypasses the grid, in this case parallel to the grid surface, passing into sample 12 (not shown in FIGS. 3a, b for clarity). The detector 5 looks at the focal point of the laser beam 8 (confocal arrangement, see FIG. 1). The sample 12 is sealed by the oil 14 located in the well and therefore cannot evaporate, so the concentration ratios remain constant. Due to the positioning possibility within the well, in the concrete embodiment implemented by motorized X, Y and Z positioning units, the focal point or the measuring volume 9 can be individually positioned within the sample 12. With a correspondingly precise holder, this is not necessary.

A prepared cryo-EM grid (coating, charge are applied beforehand) is loaded with a few microliters of the sample 12, this is usually done by manual pipetting. The same work steps are carried out as in the further cryo-EM examination. The grid is then inserted into the grid holder 11. And the grid holder 11, in turn, is transferred to the container filled with paraffin oil. Sealed in this way, measurements can be carried out on the sample 12 over longer periods of time (possibly several hours). The subsequent measurement is suitable for determining whether and if so when the contact with the grid surface has an effect on the sample 12. The DLS measurements are usually carried out as a series of individual measurements, which are then summarized as a photon count rate/time diagram or as a radius/time diagram. A control sample is usually prepared in compliance with the identical conditions (paraffin oil sealing, temperature, measurement period, etc.), which, in contrast to sample 12, rests on a polystyrene surface (not shown).

Figure 4A:
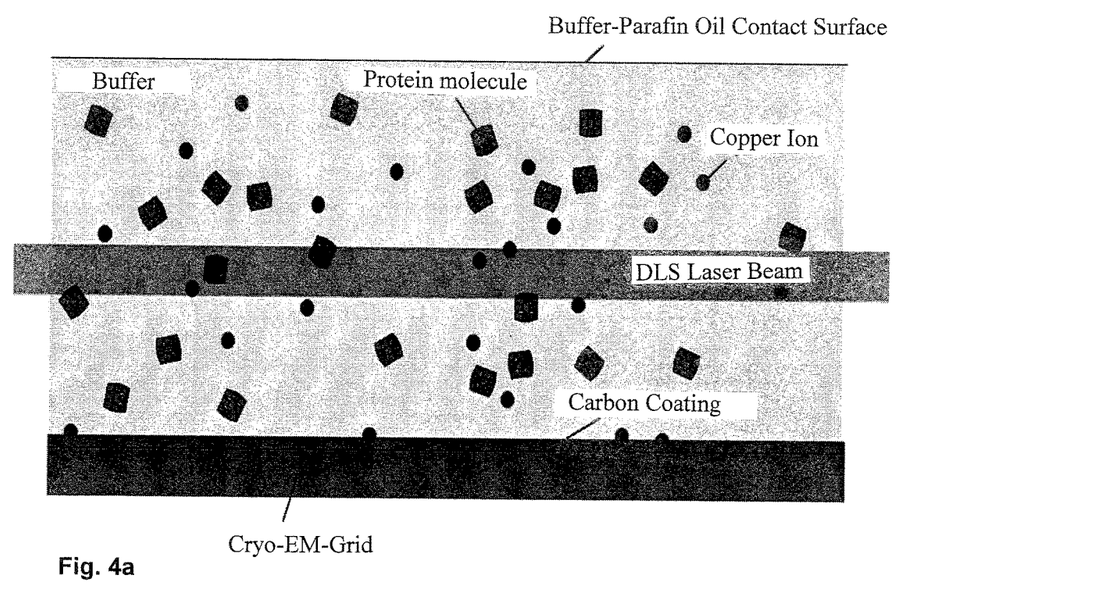
FIG. 4a, b, c a schematic representation of the processes during grid-induced aggregation of the sample 12 and FIG. 5a, b a chemical representation of an embodiment of the diffusion times as a function of the diffusion constants and distances.
Figure 4B:
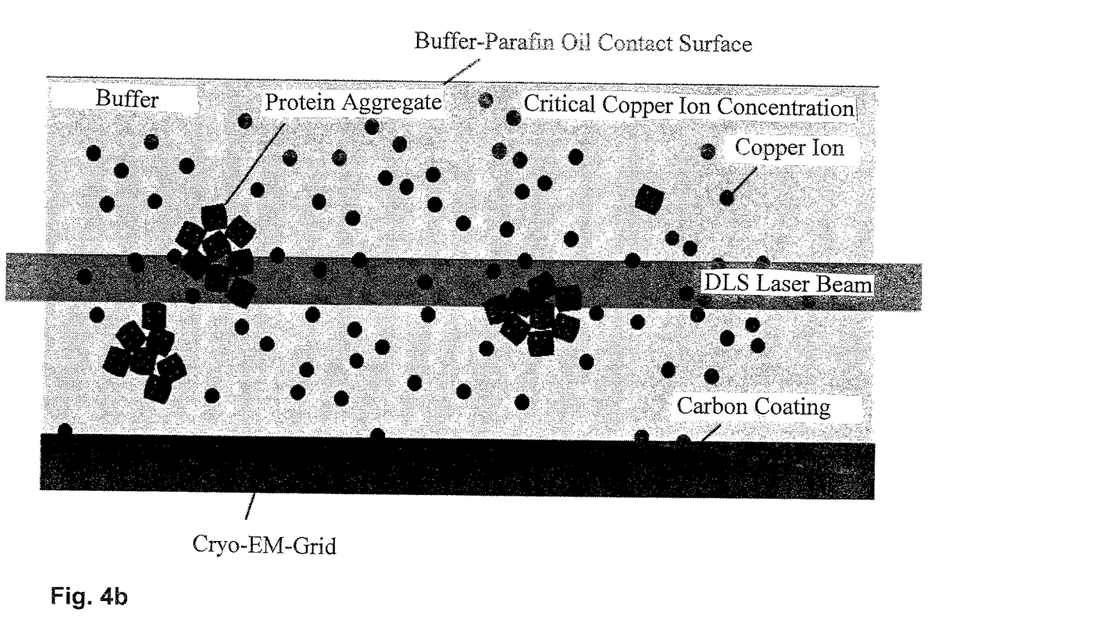
Figure 4C:
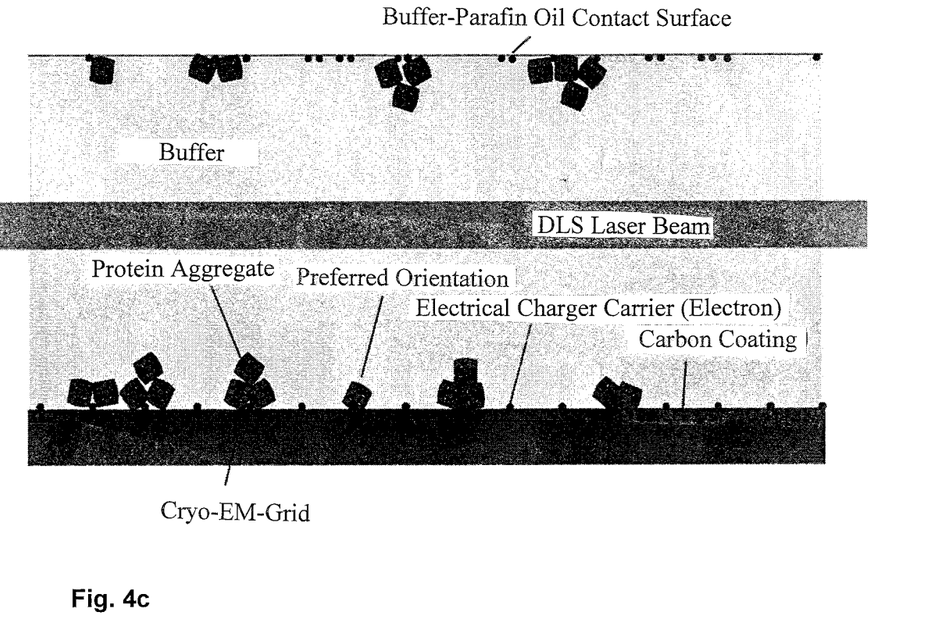

FIGS. 4a, 4b and 4c show a schematic representation of the processes in the case of grid-induced aggregation of the sample 12 and a surface attachment of the macromolecules as a result of electrostatic attractive forces.

Figure 5A:
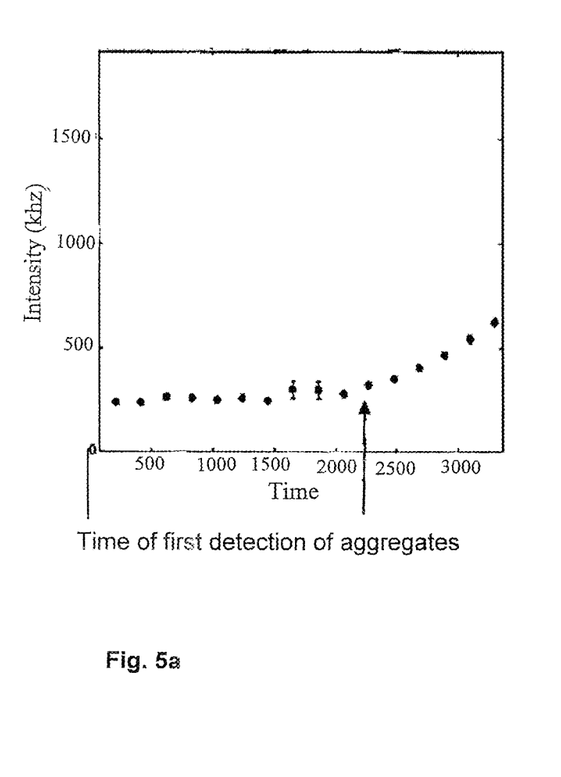
Figure 5B:
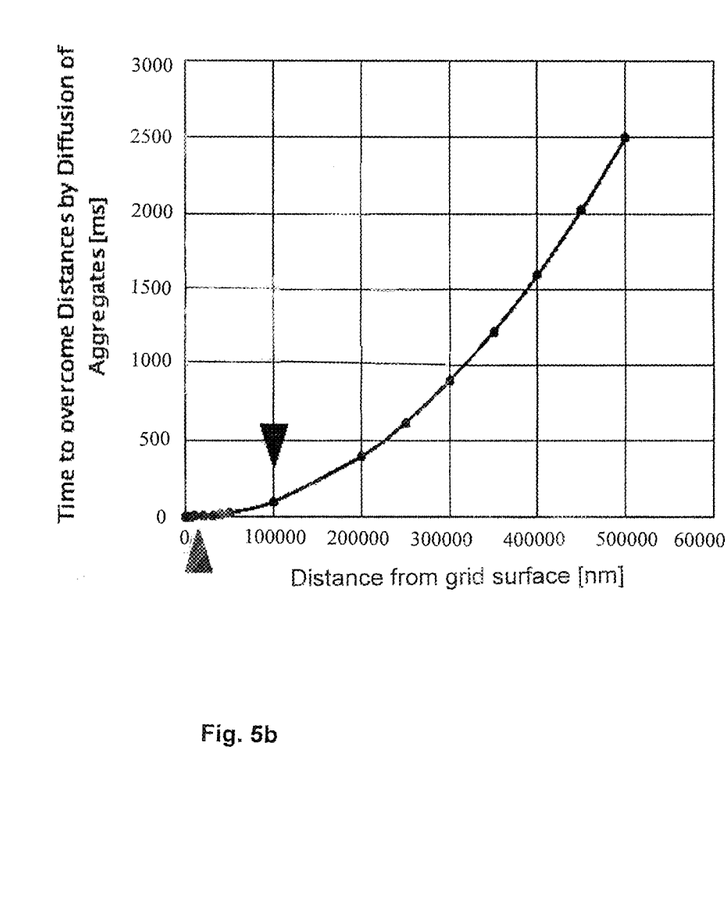

In FIGS. 5a and 5b schematic diagrams of an embodiment of the diffusion times as a function of diffusion constants and distances are shown. In FIGS. 5a and 5b dots represent time of first detection of agglomerates. For this, they must travel a distance of 0.5 mm between grid surface and measurement volume 9.

The diffusion constant of aggregates is calculated using the following formula:

$$D = \frac{m^s}{s} = \frac{0.00000025 \ m^s}{2500 \ s} \sim 10 - 10 \frac{m^s}{s}$$

FIG. 5b shows the dependency of diffusion time from distance from grid surface and measurement volume 9. The downward pointing arrow at 100,000 nm shows distance from grid surface to measurement volume 9 are transcended by aggregates by diffusion in 400 ms. The upward pointing arrow shows 10,000 nm distance from grid surface to measurement volume 9 are transcended by aggregates by diffusion in 1 ms.

The measurements on the control sample are usually used as a comparison (control) before loading the grid and after the series of measurements on the grid has been completed. If the contact of the sample 12 with the grid surface has an unfavorable effect on the solubility of the sample 12, this becomes visible after a certain time as a change in the particle size or scattered light intensity (FIGS. 5a, 5b, photon count rate as a function of time). Ideally, a sample 12, both on the grid and in the control, should have unchanged values of the count rate and radius distribution even over a comparatively long period of time. In this case it can be assumed that the sample 12 does not aggregate due to interactions with the grid or that the complexes disintegrate if an identical grid for shock freezing is loaded with this sample 12. Several explanatory models are conceivable, as to why the contact of the sample 12 with the grid surface has effects on the aggregation behavior of the sample. FIGS. 4a and b show an obvious mechanism. The buffer has corrosive properties, which attack the grid material. The metal ions detaching from the metal grid of the grid accumulate in the sample volume. The copper ion concentration reaches a critical value within a certain time; if this is exceeded, the macromolecule rapidly aggregates. The time it takes to reach this critical ion concentration is dependent on both the buffer and the macromolecule. There is also another aggregating effect and this is the plasma charging, which is a central step in the preparation of the grid. Here, the parameters of the charging density can be varied. It has been shown that a certain charge density value on the one hand binds only a few macromolecules to surfaces, but at the same time still offers sufficient hydrophilicity of the grid surface, so that the sample covers the grid sufficiently.

DLS measurements of the droplet volume of sample 12 on the grid allow conclusions to be drawn about the aggregation behavior of the individual molecules directly on the grid surface. At to, aggregation is not yet detected using DLS. The causative agent diffuses in the sample volume, until the critical ion concentration is exceeded. The DLS measurement volume 9 serves here as a representative partial volume in order to draw conclusions about the aggregation behavior of the sample 12 in the entire sample volume. The information can be used as a reliable timer for the subsequent rapid freezing process.

REFERENCE LIST

1 display device
2 autocorrelator
3 photomultipliers
4 light guides
5 detector
6 optical head
7 scatter light path
8 DLS laser beam
9 detector focus/measurement volume
10 cryo-electron microscopy—carrier (grid)
11 grid-holder [DLS] (for the cryo-EM-Grid with sample)
12 sample
13 container
14 paraffin oil

The invention claimed is:

1. A qualification process for determining a presence of clumping or dissociation of particles selected from macromolecules and macromolecular complexes in a sample (12) to be examined by cryo-electron microscopy, the qualification process comprising:
   applying the sample (12) on a sample carrier (10) provided for cryo-electron microscopy,
   scanning the sample (12) on the sample carrier by means of dynamic light scattering, determining a particle size distribution within the sample (12) by means of dynamic light scattering, and
   carrying out a determination of clumping or dissociation of macromolecules or macromolecular complexes within the sample (12) from the determining of the particle size distribution.

2. The qualification process according to claim 1, wherein the sample contains macromolecular complexes.

3. The qualification process according to claim 1, further comprising examining the sample (12), on the sample carrier used for the qualification, by means of cryo-electron microscopy.

4. The qualification process according to claim 1, wherein the dynamic light scattering uses a laser-beam, wherein the laser-beam follows a laser-beam path (8), and wherein the laser-beam path (8) is guided through the sample (12) without encountering the sample carrier (10) provided for cryo-electron microscopy.

5. The qualification process according to claim 1, further comprising adapting a cryo-sample carrier parameter as part of a sample preparation for cryo-electron microscopy by at least one of an adjustment of a cryo-sample carrier-material, an adjustment of other properties of the sample carrier, and buffering the sample.

* * * * *